No. 880,759. PATENTED MAR. 3, 1908.
G. G. SCHROEDER.
MOTOR VEHICLE.
APPLICATION FILED JUNE 20, 1906.

9 SHEETS—SHEET 1.

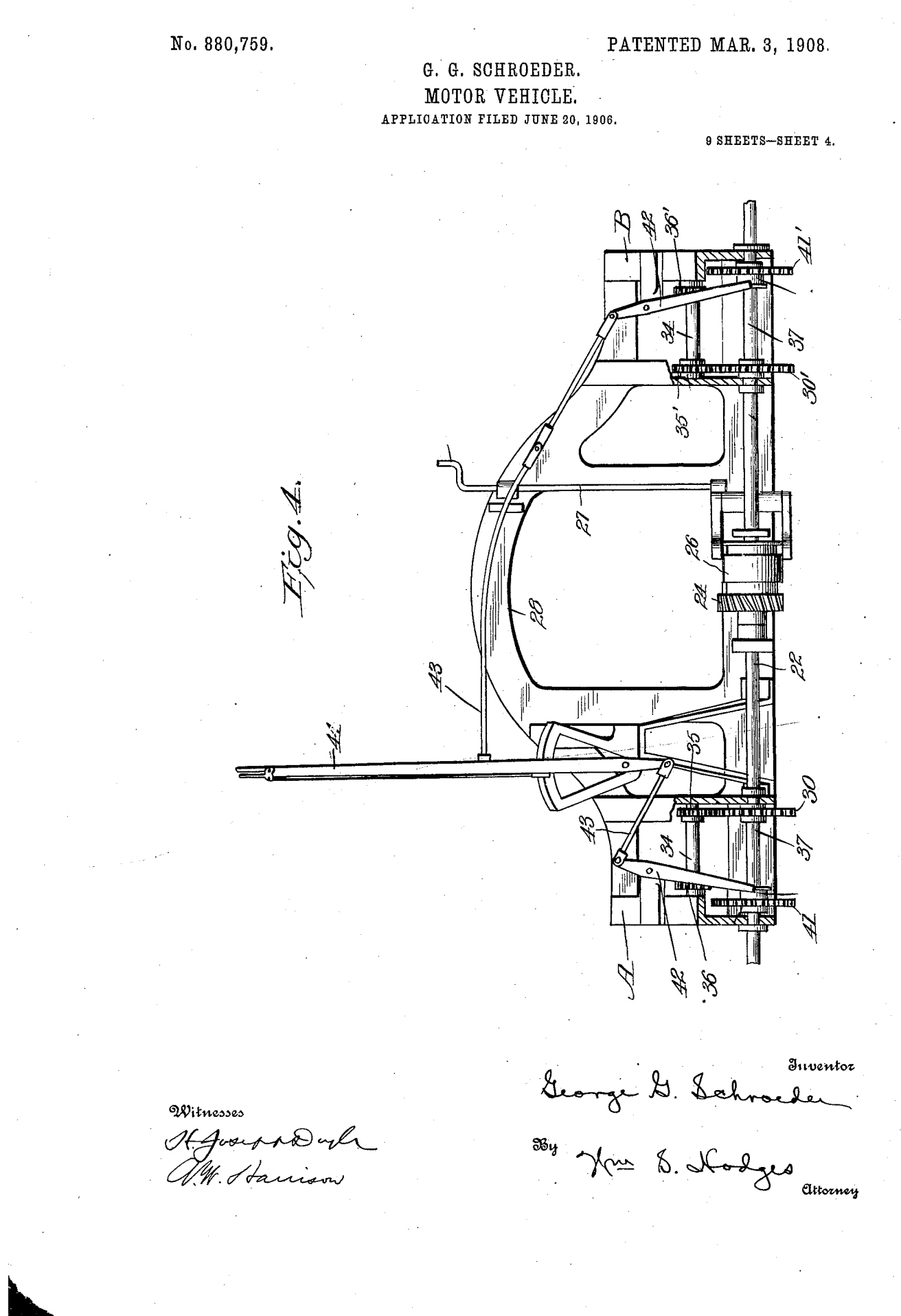

No. 880,759.

PATENTED MAR. 3, 1908.

G. G. SCHROEDER.
MOTOR VEHICLE.
APPLICATION FILED JUNE 20, 1906.

9 SHEETS—SHEET 4.

Fig. 4.

Witnesses

Inventor
George G. Schroeder
By Wm. S. Hodges
Attorney

No. 880,759.  
PATENTED MAR. 3, 1908.
G. G. SCHROEDER.  
MOTOR VEHICLE.  
APPLICATION FILED JUNE 20, 1906.
9 SHEETS—SHEET 5.
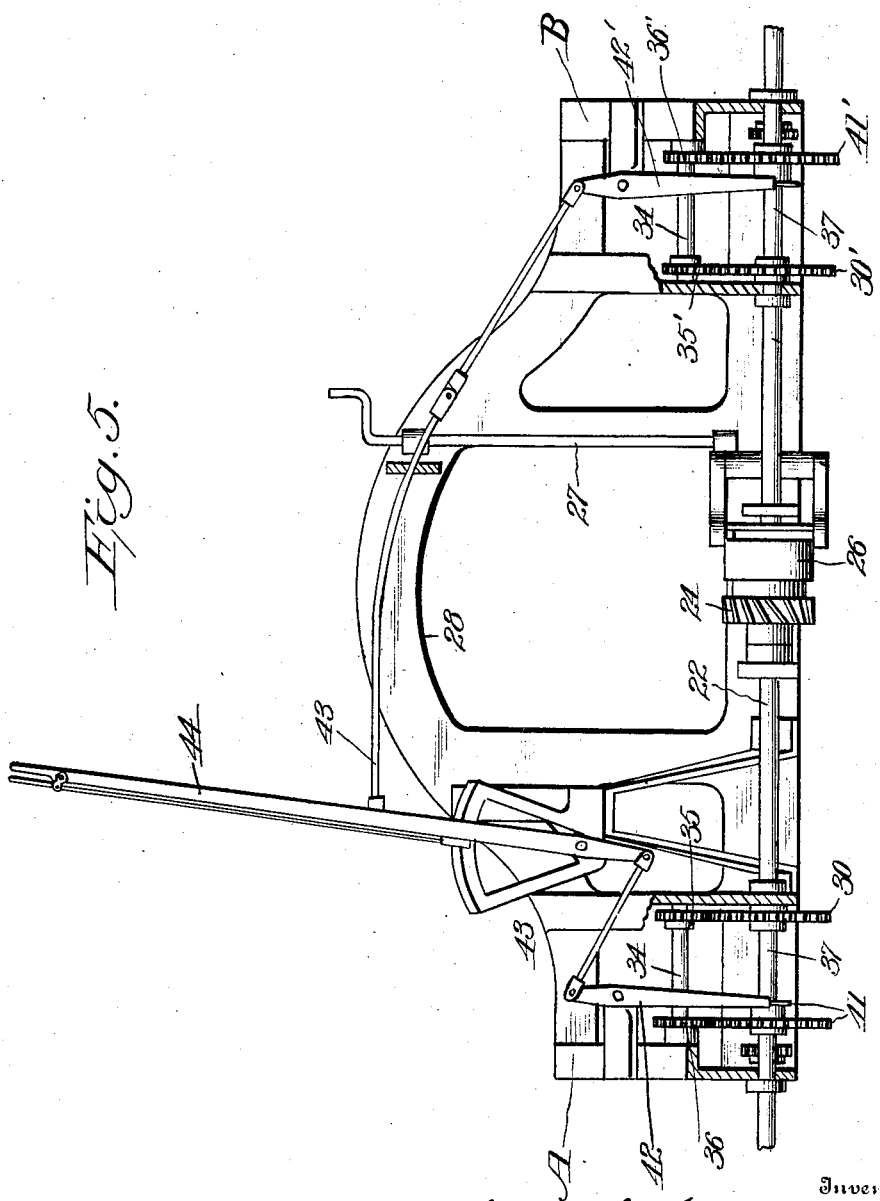

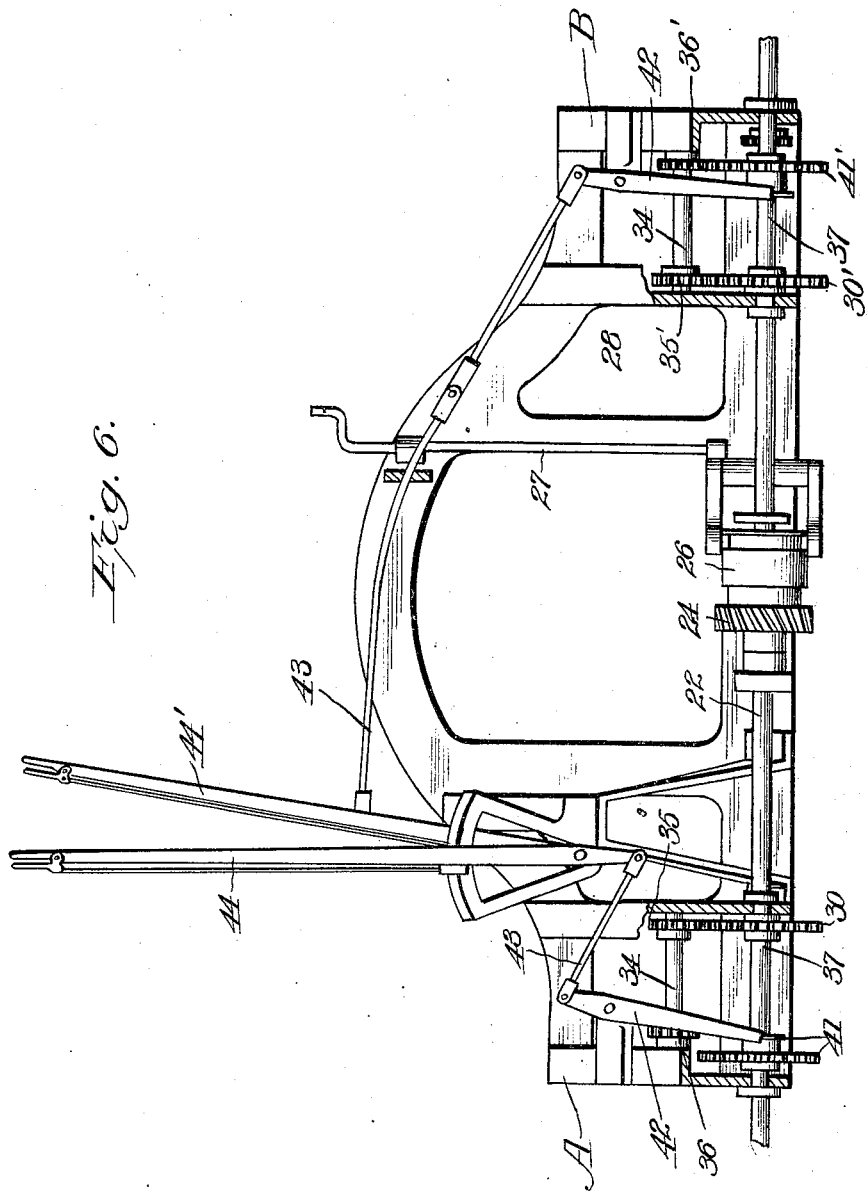

No. 880,759. PATENTED MAR. 3, 1908.
G. G. SCHROEDER.
MOTOR VEHICLE.
APPLICATION FILED JUNE 20, 1906.
9 SHEETS—SHEET 7.
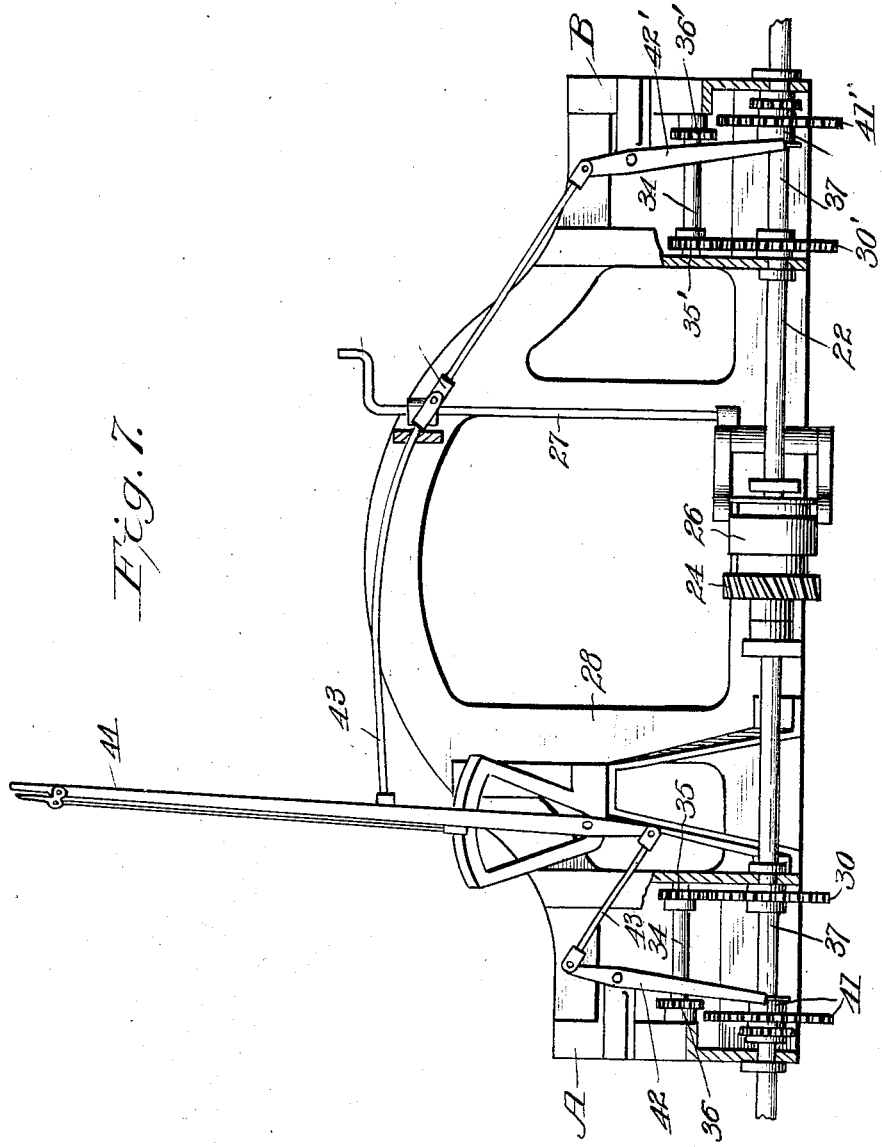

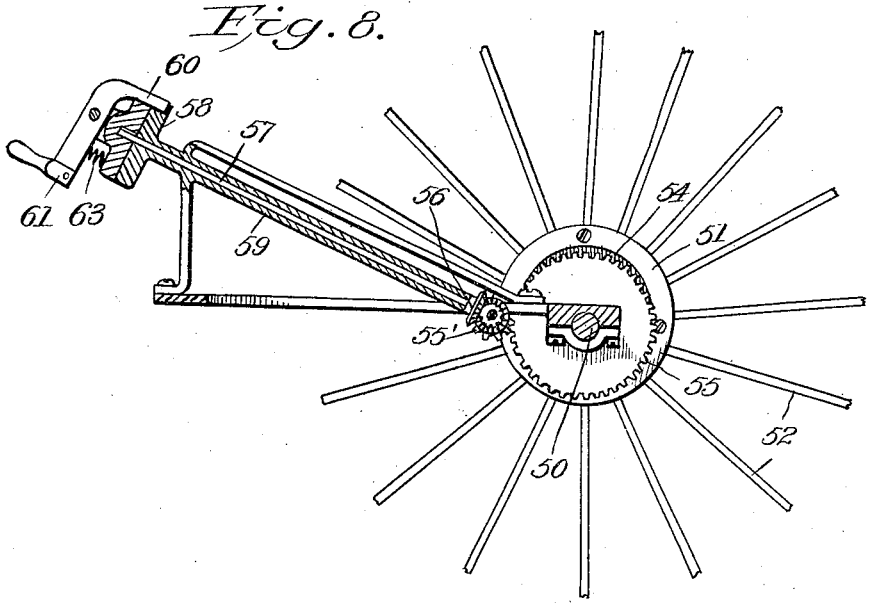
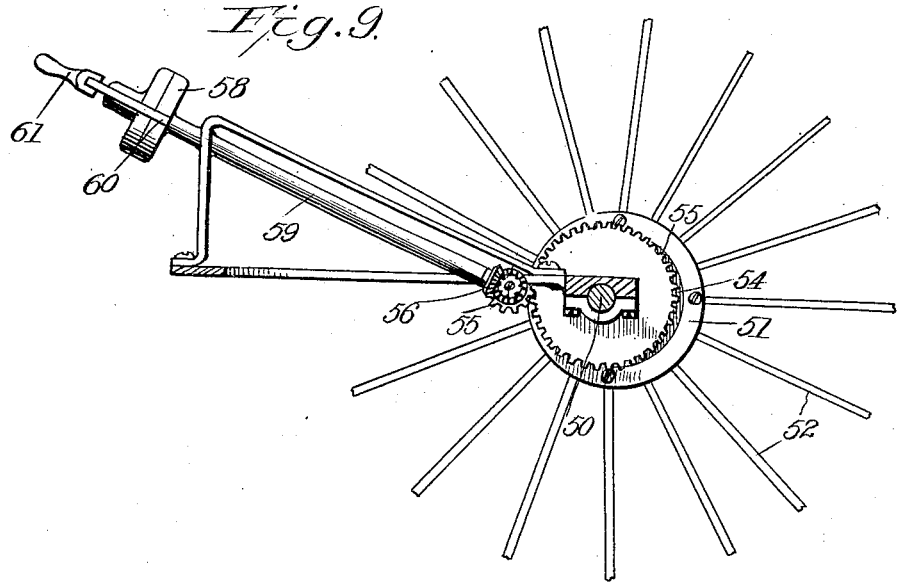

No. 880,759. PATENTED MAR. 3, 1908.
G. G. SCHROEDER.
MOTOR VEHICLE.
APPLICATION FILED JUNE 20, 1906.

9 SHEETS—SHEET 9.

Witnesses

Inventor
George G. Schroeder
By Wm. P. Hodges
Attorney

UNITED STATES PATENT OFFICE.

GEORGE G. SCHROEDER, OF WASHINGTON, DISTRICT OF COLUMBIA, ASSIGNOR TO FARM MOTOR COMPANY, A CORPORATION OF SOUTH DAKOTA.

MOTOR-VEHICLE.

No. 880,759.  Specification of Letters Patent.  Patented March 3, 1908.

Application filed June 20, 1906. Serial No. 322,563.

*To all whom it may concern:*

Be it known that I, GEORGE G. SCHROEDER, a citizen of the United States, residing at Washington, in the District of Columbia, have invented new and useful Improvements in Motor-Vehicles, of which the following is a specification.

This invention relates to certain new and useful improvements in motor vehicles.

The invention has for its object the production of improved means for applying the motive power to the traction wheels.

A further object is to provide simple and improved means for connecting and disconnecting the power with said traction wheels, and also for reversing the latter.

A further object is to provide improved means for steering the vehicle.

A further object is to provide the traction wheels with means for obtaining a secure grip upon the surface of the roadway. And a further object is to provide means for regulating the position of the tractors and controlling their gripping action.

The invention will be hereinafter fully set forth and particularly pointed out in the claims.

Figure 1:
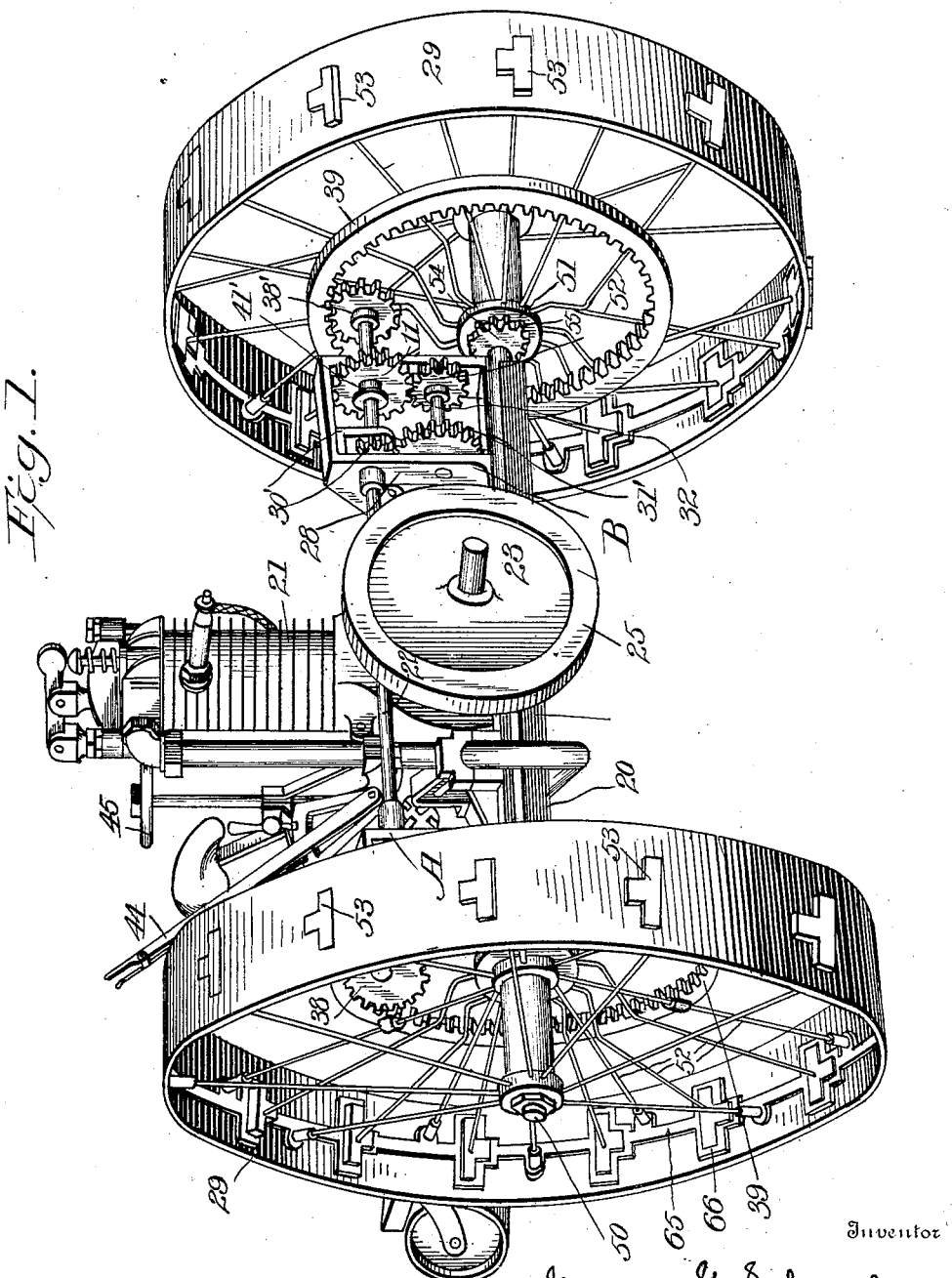
Figure 2:
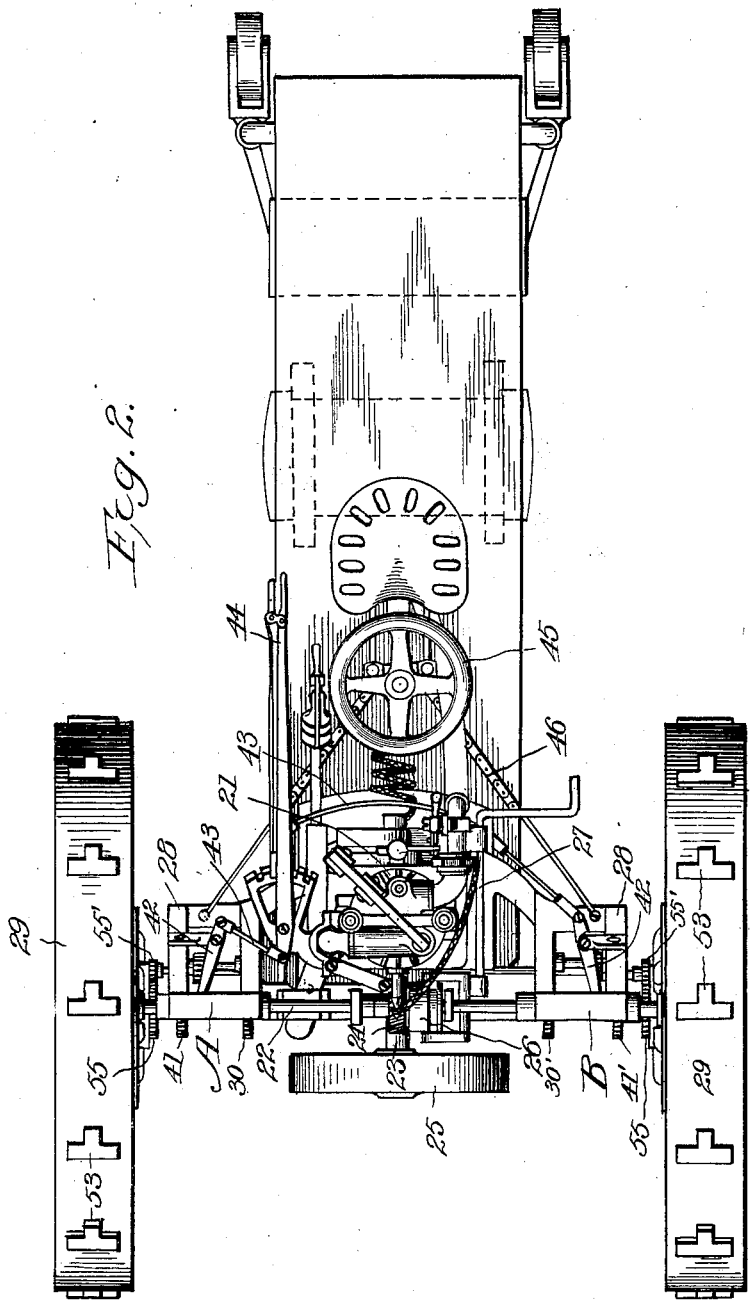
Figure 3:
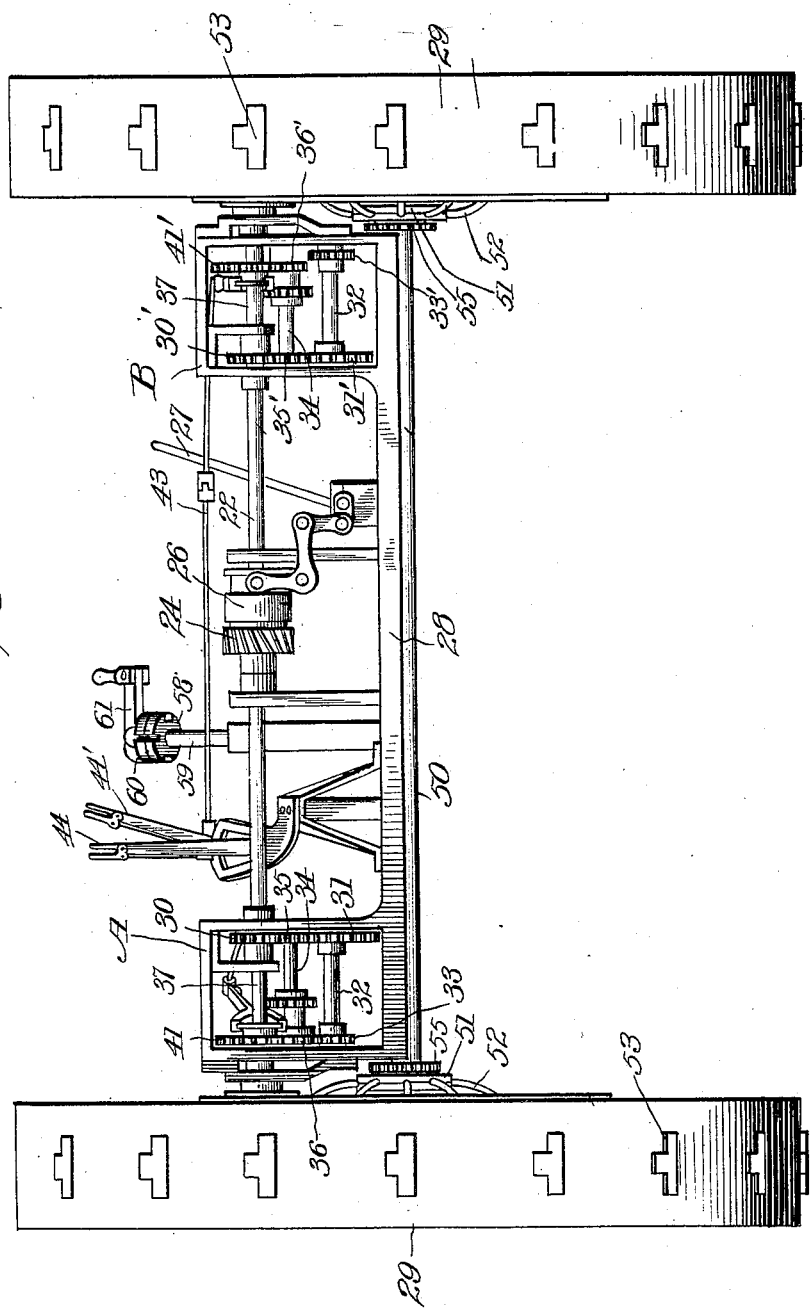
Figure 10:
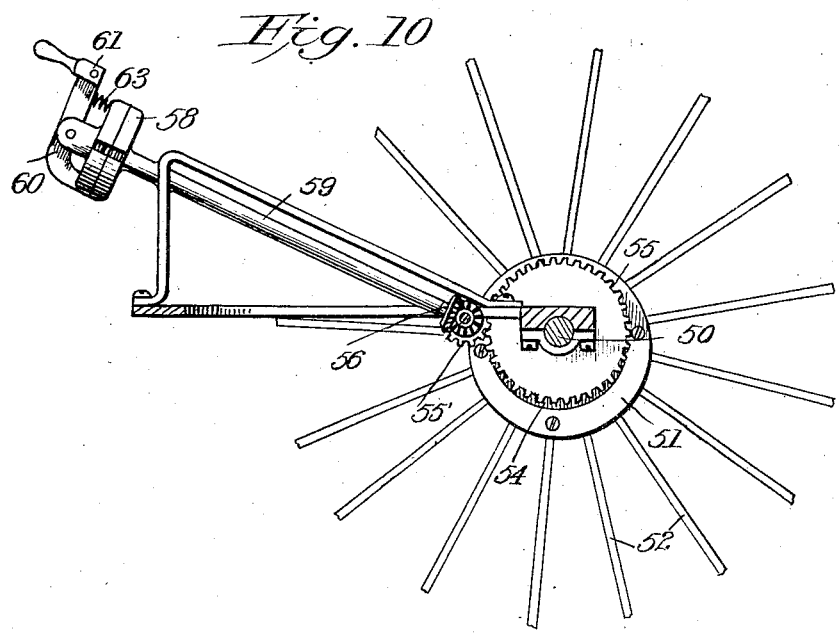

In the accompanying drawings:—Figure 1, is a perspective view illustrating my invention. Fig. 2, is a plan view thereof. Fig. 3, is a front end elevation. Figs. 4, 5, 6 and 7 are detail plan views partly in section, illustrating the steering frame and mechanism for applying power to the traction wheels. Figs. 8, 9, 10 and 11 are detail views illustrating the tractor controlling mechanism in different positions.

Referring to the drawing, 20 designates the body of the vehicle which is of any preferred form, and 21 the engine or motor from which power is derived. A counter shaft 22, is geared with the main power shaft 23, by means of worm gears 24, said power shaft 23, being provided with the usual momentum wheel 25. Means are provided, such as a clutch 26, operated by a rod 27, whereby shaft 22, may be connected and disconnected with the power. The shaft 22, is mounted in bearings carried by casings A and B, forming part of a frame 28. Said casings serve to protect suitable gearing by means of which power is transmitted to the traction wheels 29. Pinions 30, 30' are keyed adjacent the opposite ends of shaft 22, said pinions meshing respectively with pinions 31, 31' mounted on short shafts 32, supported in casings A, B, below shaft 22, similar pinions 33, 33' being secured to the opposite ends of shafts 32. To the rear of shafts 22 and 32, in each casing, is supported a third shaft 34, pinions 35, 35' being mounted on one end of each shaft 34, and meshing with the pinions 31, 31' respectively. On the opposite end of each shaft 34, is mounted a pinion 36, 36' respectively.

The ends of shaft 22, terminate adjacent pinions 30, 30', short shafts 37, being mounted in adjacent bearings with their ends abutting against the adjoining ends of said shaft 22. Pinions 38, 38' are respectively secured to the outer ends of each shaft 37, said pinions meshing with toothed collars 39, carried by the traction wheels 29. Pinions 41, 41' are slidably mounted on shafts 37, the position of said pinions 41, 41' being regulated by means of pivoted arms 42, 42' connected by suitable rods 43, to operating levers 44, 44', said levers being provided with any preferred form of locking mechanism. The frame 28, is pivoted in any suitable manner to body 20, and the whole frame is swung on its pivot by means of a steering wheel 45, engaging a sprocket chain 46, which in turn is connected at its ends to the opposite ends of said frame 28.

The wheels 29, are mounted upon an axle 50, carried by frame 28, and on the hub of said wheel is mounted a ring 51, to which are secured the converging ends of radiating rods 52, the diverging ends of which are provided with tractor blocks 53, which work in openings formed in the rims of wheels 29. An axle 50, is also mounted on eccentric 54, for shifting ring 51, said eccentric being provided with a gear 55, for operating the same. Said gear is rotated by a pinion 55' provided with beveled teeth meshing with a beveled pinion 56, secured on one end of a shaft 57, mounted in an inclined bearing sleeve 59. Said sleeve is preferably provided with an enlargement 58, having teeth adapted to receive the angular end 60, of an operating handle 61; to lock the same from movement. Said handle is pivoted upon a disk 62, keyed to shaft 57, and the angular end 60, is normally held in locked position by a spring 63. A reinforcing strip 65, is formed on the inner side of the rim of each wheel, said strip being provided with enlargements 66, surrounding the openings in which the tractor blocks work.

Figure 11:
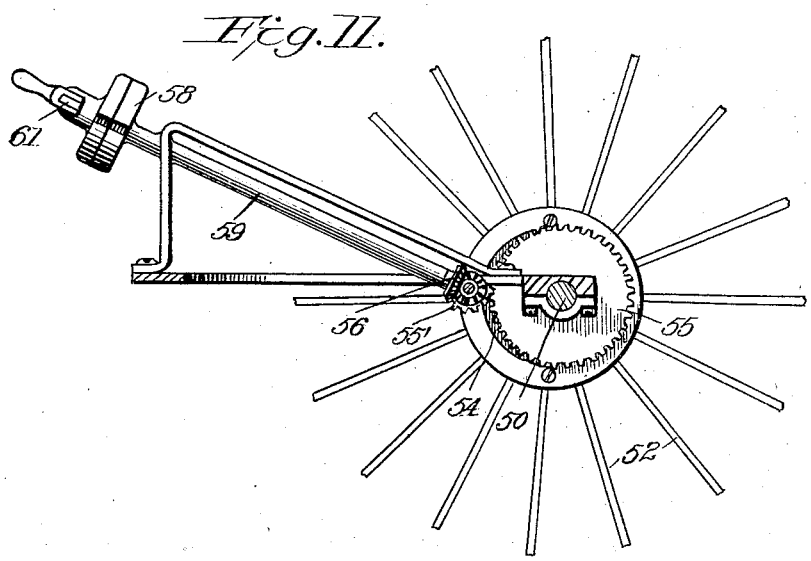

The operation of the parts is as follows:— When it is desired to move forward, the shaft 22, is connected with the power by means of clutch 26, and the pinions 41, 41' are shifted to mesh with pinions 33, 33', respectively. Shafts 32, will then be rotated by reason of the engagement of pinions 30, 30' and 31, 31', said shafts imparting rotation to pinions 41, 41' by means of pinions 33, 33'. Thus pinions 38, 38' are rotated and the power applied to the wheels. (See Fig. 4.) When it is desired to reverse the vehicle, the pinions 41, 41' are shifted to the position illustrated in Fig. 5. In this position the shafts 34, are reversely rotated through the medium of pinions 35, 35', meshing with pinions 33, 33', respectively, the reverse rotation being imparted to pinions 41, 41' by reason of the latter having been thrown into mesh with the pinions 36, 36', respectively. When it is intended to turn the vehicle the frame 28, is swung around and the wheel on the inside of the turn is reversely rotated. For instance, in Fig. 6, the mechanism adjacent casing A is connected up to impel the adjoining wheel forward, while the mechanism in casing B is shifted to reverse the adjoining wheel, the parts being shown in the act of making a turn to the left. When it is desired to temporarily disconnect the traction wheels from the power, the pinions 41, 41' are shifted to the position shown in Fig. 7, where they are disengaged from all of the driving pinions. Under normal conditions the eccentric 54, is secured in position illustrated in Fig. 8. When the parts are in this position the tractors 53, are forced out of the top of the rim 8, in at the bottom, or at the point contacting with the ground. Thus that portion of each wheel that engages the ground presents an approximately smooth surface. If, however, there is a heavy load, a sandy or muddy road, or a steep grade, or any other condition which tends to cause slipping of the wheels, the eccentric is shifted to the position illustrated in Fig. 10. When in this position the eccentric forces the tractor blocks downward to the limit of their movement, thus providing gripping devices which engage the surface of the ground to prevent slipping. Where only a slight gripping action is desired the cam is shifted to the position indicated in Fig. 9. By this means the tractors are protruded slightly in a forward direction adjacent the ground. In Fig. 11, the reverse position is shown.

The advantages of my improved motor vehicle are clearly apparent. It will be noted in this connection that I have provided simple and efficient means for applying the motive power to the traction wheels, whereby the vehicle may be impelled forward or in a reverse direction. It will be further noted that I have provided means whereby the traction wheels may be positively rotated in opposite directions in the steering of the vehicle. Another advantage lies in the readiness with which the traction wheels can be temporarily disconnected from the power. It will also be observed that by providing the wheels with tractors, and means for adjusting the latter, I am enabled to vary the traction power of the vehicle to suit practically all conditions.

I claim as my invention:—

1. A motor vehicle comprising a body provided with traction wheels, an independent drive shaft for each wheel, gearing for imparting forward and reverse rotations to each drive shaft, and a pinion slidably mounted on each drive shaft and each adapted to independently connect its respective shaft with either of its respective gearings.

2. A motor vehicle comprising a body provided with traction wheels, a counter shaft carried by said body, an independent drive shaft for each wheel arranged adjacent the opposite ends of said counter shaft, gearing for imparting forward and reverse rotations to each drive shaft, and a pinion slidably mounted on each drive shaft and adapted to independently connect the latter with either of its respective gearings.

3. A motor vehicle comprising a body provided with traction wheels, an independent drive shaft for each wheel, gearing for imparting forward and reverse rotations to each drive shaft, a pinion slidably mounted on each drive shaft and adapted to independently connect the latter with either of its respective gearings, and means for independently shifting each pinion to engage the forward and reverse gearings respectively.

4. A motor vehicle comprising a body provided with traction wheels, an independent drive shaft for each wheel, gearing for imparting forward and reverse rotations to each drive shaft and arranged on a plane below the latter, and a pinion slidably mounted on each drive shaft and adapted to independently connect the latter with either of its respective gearings.

5. A motor vehicle comprising a body provided with traction wheels, toothed rings on said wheels, an independent drive shaft for each wheel having a pinion meshing with the adjacent ring, gearing for imparting forward and reverse rotations to each drive shaft, a pinion slidably mounted on each drive shaft, and means for shifting each pinion upon its shaft to independently engage with its respective forward and reverse gearings.

6. A motor vehicle comprising a body provided with traction wheels, an independent drive shaft for each wheel, gearing for imparting forward and reverse rotations to each drive shaft, a pinion slidably mounted on each drive shaft and adapted to independently connect the latter with its respective gearings, and an independently mounted lever for shifting each pinion.

7. A motor vehicle comprising a body provided with traction wheels, an independent drive shaft for each wheel, a slidable gear mounted upon each drive shaft, and means adapted to be engaged by said gear for independently controlling the direction of rotation of each drive shaft.

8. A motor vehicle comprising a body provided with traction wheels, an independent drive shaft for each wheel, means mounted upon each shaft for independently controlling the application of power thereto, and means for independently controlling the direction of rotation of each shaft.

9. A motor vehicle comprising a body provided with traction wheels, a power shaft, short driving shafts arranged in prolongation of said driving shaft and adapted to independently drive each wheel, a slidable gear mounted upon each of said driving shafts, and means adapted to be engaged by said gear for independently controlling the direction of rotation of its respective driving shaft.

10. A motor vehicle comprising a body provided with traction wheels, independent forward and reverse gearing for each wheel, a shaft adjacent each set of gearing and provided with means for rotating the adjoining wheel, a pinion slidably mounted on said shaft and connected to rotate the same, and means for shifting said pinions into and out of engagement with said forward and reverse gearings respectively.

11. A motor vehicle comprising a body provided with traction wheels, each of which is provided with a toothed collar, independent forward and reverse gearing for each wheel, a shaft adjacent each set of gearing and provided with a pinion meshing with the toothed collar of the adjoining wheel, a slidably mounted pinion connected to rotate each shaft, and means for independently shifting each of said slidably mounted pinions.

12. A motor vehicle comprising a body provided with traction wheels, a counter shaft, means for applying power thereto, independent forward and reverse gearing for each wheel operated by said counter shaft, a short shaft adjacent each set of gearing and arranged in prolongation of said counter shaft, each of said short shafts being provided with means for rotating the contiguous wheel, a slidable pinion for rotating each short shaft, and independent means for shifting each slidable pinion to engage said forward and reverse gearings respectively.

13. A motor vehicle comprising a body, a steering head comprising a pivoted frame provided with wheels, gearing for rotating said wheels, and independent slidable gears for connecting each wheel with its respective gearing.

14. A motor vehicle comprising a body, a steering head comprising a pivoted frame provided with wheels, a counter-shaft carried by said pivoted frame, means for rotating the same, means operated by said shaft for rotating said wheels, and means for independently controlling the rotation of each wheel.

15. A motor vehicle comprising a body, a steering head comprising a pivoted frame provided with wheels, gearing for imparting forward and reverse rotations respectively to each wheel, and a slidable gear for independently connecting each wheel with either of its respective gearings.

16. A motor vehicle comprising a body, a steering head comprising a pivoted frame provided with wheels, independent forward and reverse gearing for each wheel, a pinion for operating each wheel, and independent levers pivoted to said steering head for throwing each pinion into engagement with the forward and reverse gearing respectively.

In testimony whereof I affix my signature, in presence of two subscribing witnesses.

GEORGE G. SCHROEDER.

Witnesses:
CARRIE L. MILLARD,
ELDRIDGE E. JORDAN.